INVENTOR.
Steven I. Molnar

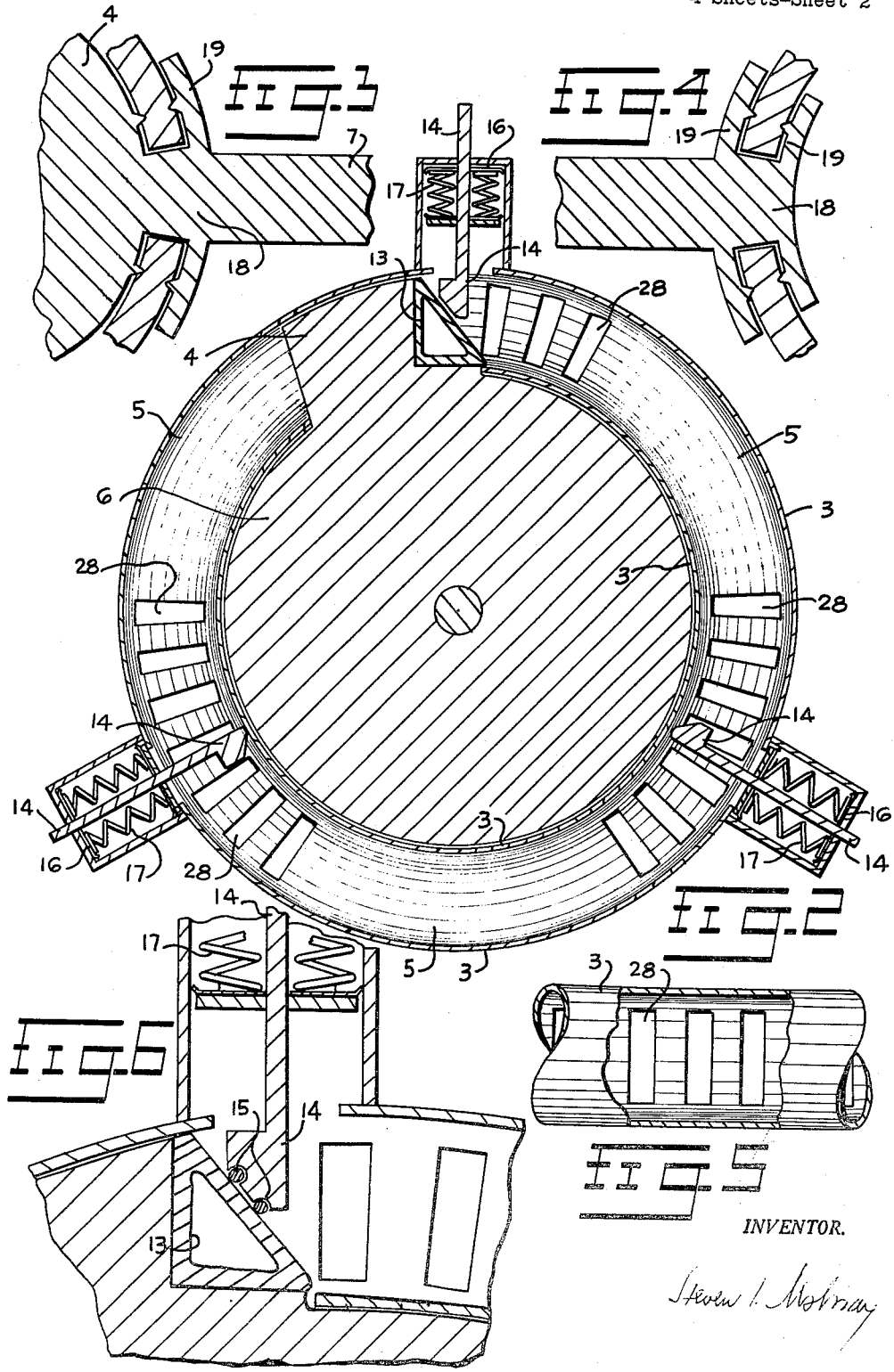

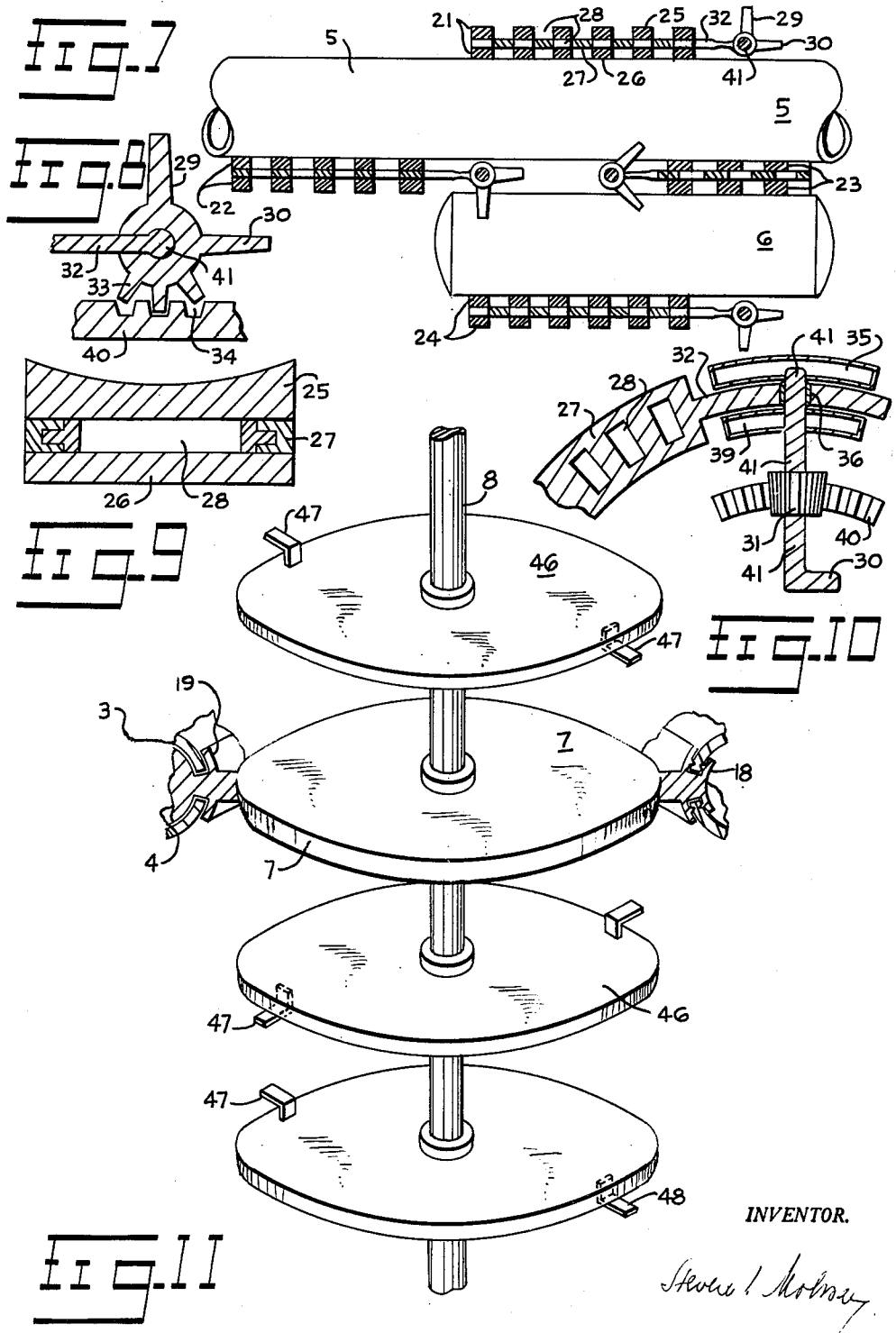

March 12, 1963 S. I. MOLNAR 3,080,722
STEAM ENGINE WITH ROTARY PISTON AND DIRECT REHEATING
Filed June 14, 1960 4 Sheets-Sheet 4
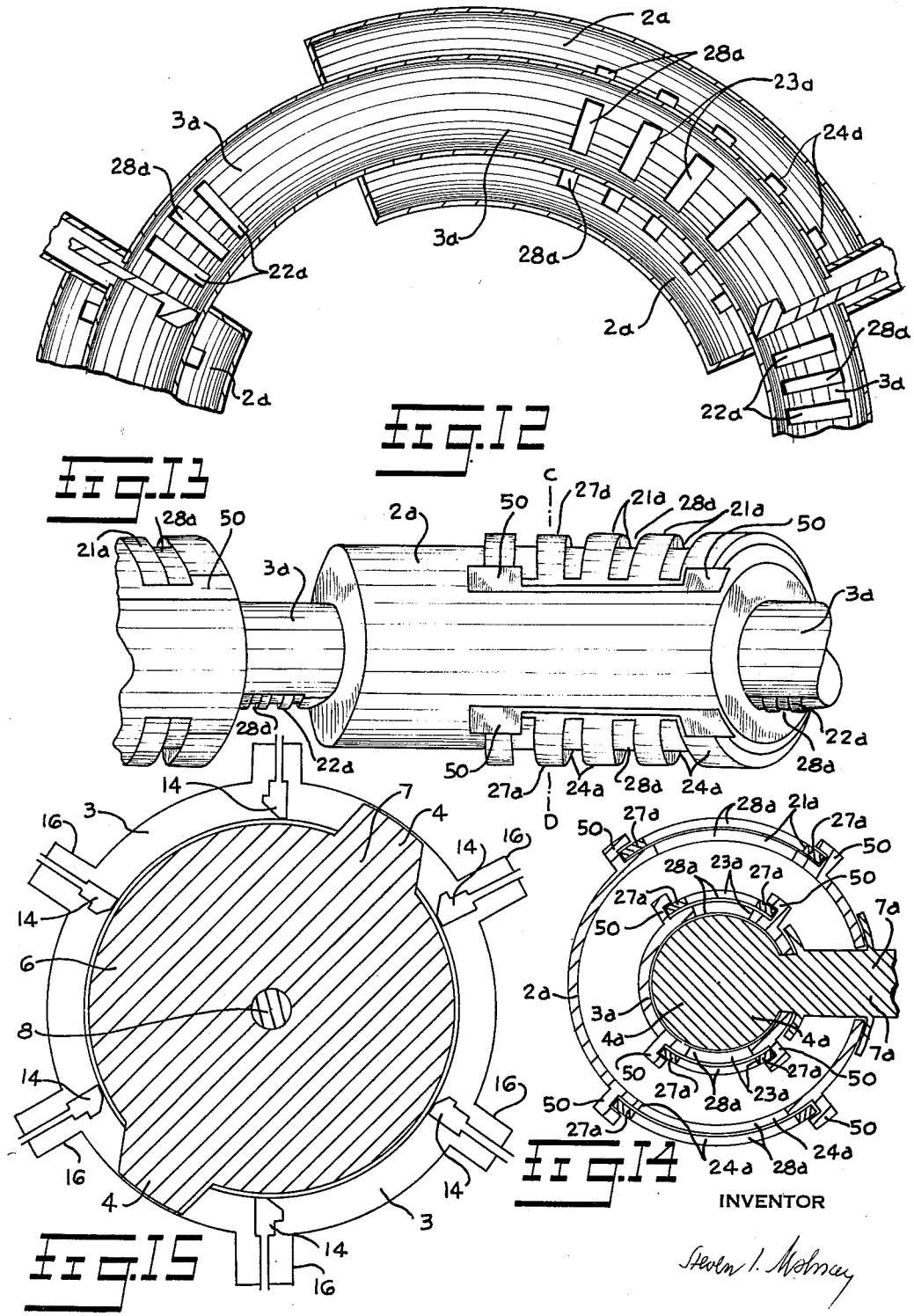
INVENTOR
Steven I. Molnar

United States Patent Office 3,080,722
Patented Mar. 12, 1963

3,080,722
STEAM ENGINE WITH ROTARY PISTON AND
DIRECT REHEATING
Steven I. Molnar, 417 Riverside Drive, New York, N.Y.
Filed June 14, 1960, Ser. No. 36,090
14 Claims. (Cl. 60—108)

This invention relates to improvements in steam engines, devising a new rotary piston engine, which embraces the important features of the reciprocating steam engine and of the steam turbine; furthermore, creating a simple, gainful reheating method for mechanically performing steam by application of an intermediate steam chamber; by the two said improvements the engine efficiency is radically augmented.

The proposed rotary piston engine has the significant advantage that the full steam pressure of the generator drives the piston steadily, assuring thereby maximum possible torque for the engine, in relation to the supplied heat.

Furthermore, the present invention takes advantage of the properties of the steam, which above boiling point needs only the addition of sensible heat above boiling point, thus a relatively small quantity of heat (roundly one B.t.u. per Fahrenheit degree per one pound water). Nevertheless, it produces progressively increasing pressure. For that reason, according to this invention, the latent heat, which comes into being below boiling point and represents a comparatively large quantity of heat (970 B.t.u. per one pound water) is constantly retained in the steam, essentially inside the engine; so, in principle the latent heat is developed only once, at the beginning of the steam generation; thereafter it forms a steady energy basis for the mechanically performing steam.

Both aforesaid innovations are applicable either with saturated or superheated steam. However, the reheating and recovery of lower pressure steam portions occur solely by admixture with saturated steam.

The rotary piston engine consists of: annular cylinder with one or more pistons, divided into sections by automatically opening and closing cross gates; intermediate steam chamber; slotted valves; synchronizing discs; furthermore conventional steam generating and cooler equipment, latter being closed to the free air.

Essentially, in each section of the rotary piston engine, the following seriatim movements and process take place, facilitated by the slotted valves; first the piston, under the steady direct pressure of the steam of the boiler, presses the cooled and lower pressure steam from the cylinder section into the intermediate steam chamber section; then these two volumes of steam mix with the heated, saturated steam bulk of the generator; afterwards, the hot steam portions of the cylinder and intermediate steam chamber sections mix with the cooled steam bulk of the cooler, which is closed to the free air. Consequently, in said two sections the pressure is reduced to significantly lower than that of the boiler, generally to near normal pressure, offering feeble cushion resistance to the again approaching piston for the rotary movement.

As a consequence of the direct reheating process, properly, no exhaust takes place from the proposed engine. So, in principle, the engine requires only a basic loading with vaporizing substance. Therefore, not only water can be used as vaporizing matter, but from thermodynamical viewpoint much more advantageous other substances, regardless of price, are also employable. The idea could be extended to many compounds, including those of more complicated, modern construction, securing further advantages for the proposed engines.

Concerning the utilization of the steam power, the rotary piston engine has a great advantage compared with other prime movers. When the piston in the reciprocating engine starts to move, the valve opens the steam port to its full extent, but closes it very early, before the stroke is completed, thus cutting off soon the supply of steam, in order to adjust in time the movement to the following dead center position of the piston. During that curbed and constantly reversed action, naturally the efficiency of the steam drops in great extent. Similar restraints take place in the turbine where the performing steam portions are separated from the mass of the steam, and in the curved passages successive reductions of pressure associated with successively decreased density occur; this constantly repeating abatement of the working steam portions substantially diminishes the effectiveness of the turbine.

In the proposed engine no curbs of the performing steam occur. The real power of the heat energy is set free; substantially, the full tension of the boiler follows the piston face in the whole length of the annular cylinder. The short span of the interchange between two cylinder sections is bridged over by the fly wheel.

Also important is the fact, that the rotary piston motion is produced without any intervening mechanism such as the crosshead and oscillating connecting rod in the reciprocating engine.

Further notable advantage is, that the rotary piston engine does not need high velocity as the turbine does in order to be economical.

In view of the fact that the pressure behind the piston is unchanging in most cases, employment of superheated steam can be eliminated. This represents not only remarkable energy saving, but also constructional advantages.

A feature of great importance in the engine is the intermediate steam chamber that alternately serves two purposes: it makes possible profitable reheating of the steam after it has done work in moving the piston, mediating that between the cylinder and generator; furthermore, it functions like secondary cylinder space, admitting and temporarily accumulating one additional moderate steam portion from the cylinder, in front of the advancing piston.

At present, in existing prime movers and especially in reciprocating steam engines the greater part of the steam energy is not utilized, their thermodynamical waste is very high. For concrete explanation, showing an average numerical example and assuming that we need 250 lb. steam pressure; in transforming one pound of water into saturated steam at standard atmosphere pressure, the amount of heat to be supplied is explicable as follows: the sensible heat required to raise the temperature of the water from 60° F. to the boiling point is about 150 B.t.u. The latent heat absorbed by the water at 212° F. before change of state takes place and heat required for the work to be done on the atmosphere, is 970 B.t.u. The sensible heat required to raise the temperature of steam from 212° F. to 400° F. is about 200 B.t.u. Total is: about 1300 B.t.u.

For simplicity all heat quantities are here given in round numbers; furthermore data which are common in all steam prime movers (heat conduction of engine parts, overcoming frictions, etc.) have been disregarded. In the following calculations, as a basis, the action of the rotary piston in one cylinder section has been regarded equal to one piston stroke in the cylinder of the reciprocating steam engine.

In the reciprocating steam engine cylinder during one stroke the steam loses its sensible heat above its boiling point, which is, in present example, about proportionate part of 200 B.t.u. Afterwards, with its whole latent heat, the steam escapes into the free air having done one single mechanically useful action in the cylinder, or it takes part in preheating of the following steam portions, but separated by metal walls from them and wasting much energy; in the turbine the waste of energy is generally the same; so, in both prime movers for the sake of the mechanical work of proportionate part of 200 B.t.u., the steam wastes continuously its sensible heat below boiling point, proportionate part of 150 B.t.u. and its latent heat, proportionate part of 970 B.t.u. altogether proportionate part of 1,100 B.t.u. The proposed engine saves a great part of this heat quantity. The rotary piston engine does not discharge the steam into the free air, it retains all steam in itself, it lets mix differing steam portions directly, giving opportunity for new intense molecule process and thereby sudden increase of tension. The useful mechanical work in the annular cylinder is effected by about proportionate part of 200 B.t.u., similarly to the reciprocating engine, this energy is supplied directly by the steam bulk of the generator. It will be noted, that during the above mentioned first equalizing two sections' volume of cooled steam are delivered back to the steam generator, consequently, both of them need further sensible heat quantities, proportionate part of 200 B.t.u. plus 200 B.t.u. equals 400 B.t.u. for reheating. So, the entire recovery requires the proportionate part of (200 plus 200 plus 200) 600 B.t.u. As has been demonstrated above, prior steam engines need, to new piston or turbine wheel action, the proportionate part of 1,300 B.t.u.; so, the saving in the rotary piston engine is the proportionate part of 700 B.t.u., which is more than half the energy that would be needed for existing prime movers to produce a certain pressure on a given surface.

Between 400° F. and 500° F. another thermodynamical advantage becomes increasingly exploitable and in numerical respect partly modifies the precedingly elaborated process. The sensible heat of the steam per temperature degrees practically can be regarded as constant but, in the same time, the steam pressure is progressively increasing. So, when we parallelly increase the temperature of the boiler and of the cooler, keeping a certain temperature difference between two said spaces, for instance 200° F., the net piston pressure increases progressively; going upwardly greater and greater gain appears, against comparatively small quantity of heat (proportionate part of 600 to 700 B.t.u.) progressively increasing net piston pressure is obtainable. This outcome is achievable by the mere addition of sensible heat, since the latent heat steadily supports the development. The value of fuel saving, in this manner, needs serious consideration, collating the saving with higher expenses of necessitated stronger engine parts. The usage of high temperature and high pressure promises favorable result, not only for turbines, but also for rotary piston engines.

In the foregoing has been demonstrated the important role of the intermediate steam chamber concerning fuel saving and efficiency increasing. However, the annular cylinder with rotary piston is also employable without intermediate steam chamber, with direct exhaust to the free air.

In accordance with the rotary movement of the piston and with the necessity of quick and intense exchange of circulating heated and cooled steam portions, a new system of valves has been established; slotted valves, governed by synchronizing discs which operate in precise compliance with the piston movement. Simple valves make possible instant change of local steam pressure from minimum to maximum, and conversely.

Apertures of the slotted valves open and close simultaneously and instantly, caused by very short movements, offering free passage for the circulating steam portions. Number of the apertures in the valve plates can be easily increased, in relation to the number of the apertures shown in the enclosed drawings, and, for instance, apertures can be formed almost on the whole circumference of the annular cylinder or intermediate steam chamber and their opening and closing still remain simple.

Said new kind of valves are preferably applied to the proposed engines; however, they can be replaced by any other conventional valves, if desired.

Summarized: In the present invention the rotary piston engine produces unrestricted steam pressure on the piston face, securing uncurbed swing for torque; by applying the intermediate steam chamber economizes the great part of the performing heat energy; facilitates application of forceful new vaporizing substances, price no object; consequently, the new found construction and method radically increases the engine efficiency.

For further comprehension of the invention, and of objects and advantages thereof, reference is made to the following description and accompanying drawings, and to the appended claims in which the various novel features of the invention are more particularly set forth.

In the accompanying drawings forming a material part of the disclosure:

FIG. 2 is a horizontal cross sectional view taken on the line A—B of the engine shown in FIG. 1.

FIG. 3 is a cross sectional view of the slidable ring with the piston in the cylinder.

FIG. 4 is a cross sectional view of the slidable ring on the opposite side to the piston in the cylinder.

FIG. 5 is elevated view of the apertures of the slotted valve inside the annular cylinder.

FIG. 6 is a horizontal cross sectional view of the cross gate with the front end of the piston.

FIG. 7 is a diagrammatic longitudinal sectional view of the annular cylinder, intermediate steam chamber, slotted valves and valve regulating implements.

FIG. 8 is a cross sectional view of the turning rod with teeth and lever arms between the slotted valve and gear segment.

FIG. 9 is a cross sectional view of the slotted plates of the valve.

FIG. 10 is a longitudinal sectional view of one slidable slotted plate of the valve with the turning rod and gear segment.

FIG. 11 is a perspective view of the rotary piston disc, furthermore, of the synchronizing discs with inclining ends, fixed on the engine shaft.

FIG. 12 is a horizontal sectional view of the jacket-like intermediate steam chamber, with the annular cylinder inside and with curved slotted valves.

FIG. 13 is a perspective view of the jacket-like intermediate steam chamber inside with the annular cylinder and with slotted valves.

FIG. 14 is a cross sectional view taken on the line C—D of the intermediate steam chamber and piston with curved slotted valves shown in FIG. 13.

FIG. 15 is a horizontal sectional view of an annular cylinder with two rotary pistons and six cylinder sections.

Figure 1:
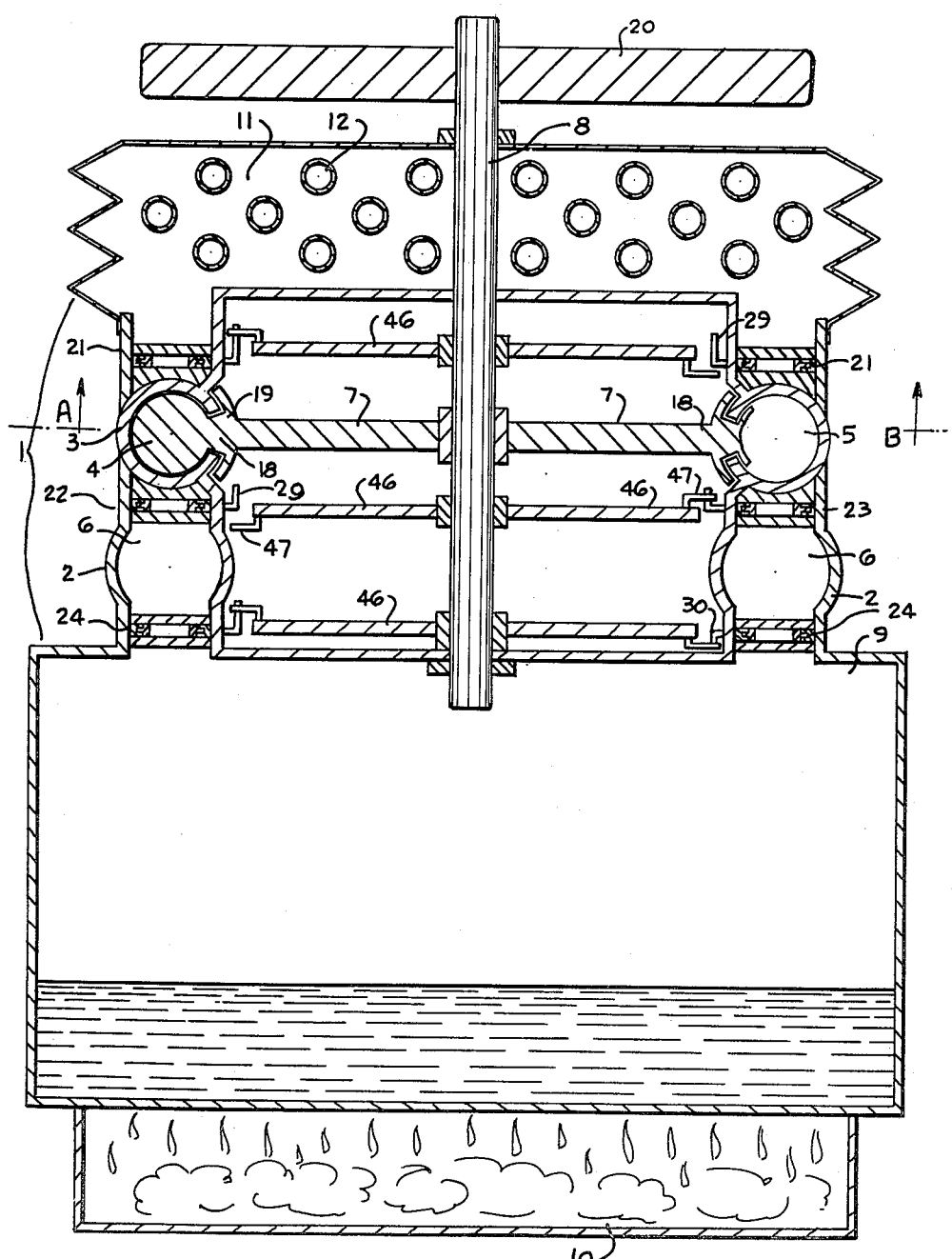
FIG. 1 is a vertical cross sectional view, with parts broken away, of a rotary piston engine constructed and arranged in accordance with present invention.

Referring more particularly to the drawings, the rotating piston engine is designated by 1 reference numeral.

In FIG. 1 the rotary piston engine 1 is shown in vertical arrangement, the boiler 9 and firebox 10 are adjusted to that position; it is apparent, that any other required variation can be constructed.

The proposed circular engine 1 has a comparatively large diameter in order to secure enough time for circulating steam portions to change pressure and temperature. The annular cylinder 3 is divided into two or more sections 5. While, for simplicity, only three sections are shown and described in detail, it is apparent, that more can be provided, as for instance, is shown diagrammatically in FIG. 15.

The cylinder sections 5 are separated by repeatedly and automatically closing and opening cross gates 14. On the front end of the piston an oblique rib 13 is applied, in order to push the cross gate 14 against springs 17 gradually out of the way of the piston 4, which movement is facilitated by ball bearings 15 embedded in the oblique surface of the cross gate. Behind the passed piston the cross gate 14 is closed automatically by the springs. The case 16 including the springs 17 is hermetically closed to the free air.

Next to the engine shaft the inner side of the annular cylinder is interrupted by a groove of ring form including a slidable ring 18, which has one or two extensions of U form in order to seal hermetically the edges of said split. The slidable ring 18 is rigidly fixed to the piston 4 and they are rotating together transmitting the rotary movement through the piston disc 7 to the engine shaft 8 and the flywheel 20. In this manner, the annular cylinder is entirely closed, and the rotary movement originated in the inside of the cylinder is fully transmitted to the engine shaft with minimum friction.

All valves 21, 22, 24 and the cross gate 14 are closed, except the valve 23 between cylinder section and intermediate chamber section 6, which is open, before the entering of the piston in one cylinder section 5. Then the cross gate opens automatically by the piston movement. At this moment in the said two sections 5, 6 reduced, generally near normal atmospheric pressure prevails. The advancing piston 4 pushes this cooled steam from the cylinder section 5, into the intermediate chamber section 6, where the pressure is thereby doubled (see Boyle-Mariotte Law). Behind the rear end of the advanced piston 4, the valve 22 between the cylinder section 5 and steam generator 9 opens and the piston receives full and constant pressure from the steam generator during its whole movement in the cylinder section. The valve 23 between the cylinder section 5 and intermediate chamber section 6 closes when the front end of the piston reaches said valve 23, which remains closed until the rear end of the piston enters the next cylinder section and the cross gas 14 closes behind it. At this moment said valve 23 opens again, then immediately also the valve 24 from the intermediate chamber section 6 to the steam generator 9 opens and the content of the cylinder section 5 and intermediate chamber section 6 and steam generator 9 instantly diffuse and equalize. As a consequence, the intermediate steam chamber section 6 and the cylinder section 5 contain again only one-one hot steam portion, corresponding to their own volume. The third one has just been blended and dispersed in the heated bulk of the steam generator. Now the valve 24 between steam generator 9 and intermediate chamber section 6 closes and ensuingly the valve 21 between cylinder section 5 and cooler 11 opens and a second equalizing takes place. As a consequence, the pressure also in the two said sections 5, 6 drops to nearly standard atmospheric pressure, which will be encountered by the anew approaching piston 4. Before the piston enters again the cylinder section, the valve 21 to the cooler closes, thus, only the front end valve 23 to the intermediate chamber stays open. So, the piston continues its way around, developing unrestricted torque which is made unruffled by a conventional flywheel 20 fixed on the engine shaft 8.

As it has been described concerning the first section, same seriatim operation takes place in all following sections.

The proposed engine also can be provided with plurality of rotary pistons, spaced apart at equal angular intervals of the circumference, attached to the engine shaft by rods, repeating seriatim the same operation in each section of the circular system as one single piston does in the annular cylinder system; see FIG. 15.

The volume of one intermediate steam chamber section 6 is approximately equal to or smaller than that of the annular cylinder section 5. The intermediate steam chamber 2 is likewise divided into several sections 6 as is the cylinder, but the cross walls of the intermediate steam chamber sections 6 are constantly closed, they are not movable. Said two spaces 5, 6 are connected by slated valve 23. Another valve 24 operates between the intermediate steam chamber section 6 and the steam generator 9.

As has been stated above when the cooled steam portion is pushed from the cylinder section into the intermediate steam chamber section, the pressure there will be approximately doubled (about to 30 pounds or 2 atmosphere pressure). So, in front, the piston finds doubled resistance, compared with other prime movers. However, the otherwise saved large quantity of energy can balance easily this minor disadvantage. In average, the mentioned loss in piston thrust can be eliminated by increase of the steam temperature with about 10° F., thus, with proportionate part of 10 B.t.u., which is a small quantity of heat energy, in comparison to the saved proportionate part of 700 B.t.u.

The inside surface of the intermediate chamber 2 is covered by well isolating materials, in order to keep the temperature of the chamber wall low. For large intermediate chambers special wall cooling, perhaps circulating water or the like, might be necessary.

The position of the intermediate chamber to the annular cylinder is variable in several combinations. For instance, their location can be side by side on the same level; one or both of them can be partly embodied into the steam chest or cooler; the intermediate chamber can have quadrilateral shape, etc., according to requirements. In this description the most basic solution is elaborated; all other variations can not be demonstrated. However, one of them as the most important, has to be exposed when the intermediate steam chamber is positioned exteriorly around the annular cylinder, with interruptions to give space for the steam proceeding into the cylinder.

In this jacketlike constructed mechanism the sequence of steam exchange and admixture is the same and the operation is similar as is described concerning the two leveled system, shown in FIGS. 1 to 11. Parts of the jacketlike intermediate steam chamber and annular cylinder are designated in the FIGS. 12 to 14 like the same parts of the two leveled system, but for distinction "a" letters are inserted to the reference numerals, as follows: intermediate steam chamber 2a, annular cylinder 3a, rotary piston 4a, rotary piston disc 7a, movable valve slides 27a, slotted valve to steam generator from annular cylinder 22a, slotted valve to cooler 21a, slotted valve between annular cylinder and intermediate steam chamber 23a, slotted valve from the intermediate chamber section to steam generator 24a, apertures for steam passage 28a, frame for the slidable plate of slotted valves 50. The slated valves may also consist of two plates only and walls of the intermediate steam chamber or annular cylinder can serve as the unmovable slides. The curved valves are also governed by synchronizing discs as is described in detail concerning FIGS. 7 to 11.

In the rotary piston engine FIG. 1 each section of the cylinder and intermediate steam chamber includes at least four slotted valves: one between steam generator and cylinder 22; one between cylinder and cooler 21; one between cylinder and intermediate chamber 23; one between intermediate chamber and steam generator 24.

The slotted valves 21, 22, 23, 24 are composed of two or more parallel slides 25, 26, 27, each of them having a plurality of apertures 28, which can be brought in coincidence or in covering. One or more of the non-movable slides 25, 26 are mounted on the rim of the cylinder or on other non-moving engine parts; one or more slides 27 are slidably placed between said non-movable slides 25, 26. The interposed movable slide 27 has an extension 32 to which a rod 41 is attached forming connection between the synchronizing disc 46 and the valve. The rod 41 is slidably positioned in two horizontal grooves 35, 39 and is turning in a housing 36. The rod has teeth 33 which are meshing with the teeth 34 of a gear segment 40 fixed on the body of the cylinder or other parts of the engine.

The outer end of the rod is provided with a lever of two arms 29, 30, in L form.

Alternately, one of the two lever arms 29, 30 receives the push of one of the inclining ends 47 of the synchronizing disc 46. This push turns the rod 41 and, as a consequence, it is forced to roll forward or backward on the gear segment 40, and by this movement the slotted valve apertures 28 are opened or closed for steam passage.

Operation of the slotted valves is only slightly hindered by frictions. Opening is not impeded in half of the cases as the same pressure prevails on both sides of the valves and when this is not the case, merely the start of the opening is tense and afterwards the higher pressure from one valve side even ameliorates the move. Closing is not hindered by friction at all, since in all cases of the operation, during these spans, same pressure prevails on both sides of the slotted valves, so the movement of the slidable plates is easy.

The synchronizing discs 46 assure precisely timed joint operation of the valves with the piston 4, steam space 9, intermediate steam chamber 2 and cooler 11. The synchronizing discs can be also used for regulation of other functions (lubrication, etc.) of the engine. Discs operating closely to each other are preferably to be replaced by a common disc.

The synchronizing disc edge is moving alongside the valves, the disc 46 is rigidly fixed on the engine shaft 8, which is directly connected with the piston 4. Each disc has on its upper and lower surface a plurality of raising extensions 47, with their edges inclining to the said lever arms 29, 30 fixed on the axis 41 of the valve regulating implement. The inclining ends 47 are alternately pushing one of the two arms 29, 30 of the lever, forcing thereby forward or backward movement of the movable valve slide 27, thus, opening or closing the apertures 28 for the flow of the steam.

The steam generating device consists of conventional firebox 10 and boiler 9, where heated liquid becomes steam; heating is possibly by coal, oil, or electricity. Automatic control features regulating heat control, steam pressure, water level and safety valves are incorporated (implements are not shown).

The steam generator is supplied with steam by a boiler of any conventional type. The inner side of the steam space is provided with conventional coils to obtain instant heat for quick reheating. Constant circulation and admixture of differing steam portions can be accelerated by employing conventional blower which is belt driven from the motor. To facilitate exchange of steam portions in other parts of the engine, the steam generator is to be built close to the cylinder, and it has to have voluminous spaces and pipes for free steam communication.

The steam generator 9 communicates with each cylinder section 5 by slotted valves 22, for adjusting openings for passage of steam portions. Also between the steam generator and intermediate chamber there is at least one slotted valve 24.

The cooler 11 contains cooled steam with a certain constant difference of temperature and pressure to the content of the steam generator 9. Consecutive and seriatim renewal of this difference at the two respective ends of the piston assures the rotary movements.

All cooling occurs above the boiling point of the working substance, in order to retain the latent heat in the steam or other vapors. The cooling is primarily accomplished in the natural way. The cooler is a simple metal box. Several tubes 12, open at their ends, cross the cooler, which can also be provided with ribs to form sufficient space and surface for intense cooling. In some installations forced cooling can be desirable; furthermore, blower can be adapted to accelerate the circulation and admixture of differing steam portions.

The cooler communicates with the annular cylinder sections through slotted valve 21 for adjusting apertures 28 for passage of steam.

The operation of the apparatus is as follows: Steam is generated in the chamber 9 which is in direct communication with the valves 22 and 24 which connect to the annular chamber 5 and the three separate chambers 6 which are circumferentially spaced below the annular chamber 5. Chamber 5 includes an inlet valve arrangement 22 which has slotted openings which are coverable by a slotted lever plate 32. The lever plate 32 is provided at one end with a rotatable right angled lever control 29, 30 (FIG. 8) for sliding the slotted plate backwardly and forwardly between a position opening and a position closing the valve 22 (see FIG. 7). The fingers 29 and 30 are disposed alongside the annular chamber 5 for actuation by projections 47 which are formed on the disc plate (FIGS. 1, 7 and 11). Thus when the piston portion 4 proceeds beyond a position indicated in FIG. 2, the piston opens the gate valve 14 and thereafter uncovers, with its trailing edge, one of the ports 28 and to permit the piston gate 14 to close. The projection 47 also contacts finger 29 to uncover the slots of the valve 22 so that steam is admitted behind the piston to drive it forward. When the piston 4 gets to the point at which its trailing edge uncovers the next series of ports 28, one of the projections 47 contacts a lever control for the valve 23 permitting exhaust of the steam ahead of the piston to the chamber 6 which is thereafter sealed from communication wtih the steam generating chamber 9 by means of the valve 24. Thereafter valve 24 is actuated to communicate chamber 6 with the chamber 9 so that the exhaust steam is returned to the chamber 9 and upon further movement of the piston chambers 6 and 5 are communicated through valve 21 to the cooler compartment 11.

Cooling is directed through the tubes 12 in an amount to insure that the exhaust pressure is low in compartment 11 but that little or no steam is condensed. Thus, the steam portions are returned to the cycle through the chamber 6 to the chamber 9 and no energy is wasted in condensing the steam back to liquid and thereafter reheating it to convert it to steam. Thus, the engine will operate at the upper portion of a steam heating curve in which the liquid is already converted into a steam and it is not necessary to expend energy in continuously condensing the liquid and thereafter reconverting it back to a vapor.

The gate valves 14 function to separate a plurality of annular individual cylinder sections, each of which is utilized to direct the full pressure force of steam against the trailing edge of the piston in order to give it a rotatable movement. Once the piston front edge contacts the gate of the next compartment it lifts it up to permit entry of the piston therein. When the trailing edge of the piston passes the valve it again closes in order to seal this compartment to insure that the steam is trapped therein for driving the piston forward.

While I have illustrated and described the preferred embodiment of my invention, it is to be understood that I do not limit myself to precise construction herein disclosed and the right is reserved to all changes and modifications coming within the scope of the invention as defined in the appended claims.

Having thus described my invention, what I claim as new, and desire to secure by United States Letters Patent is:

1. A rotary vapor engine comprising an annular tubular casing, a rotary piston operating within said casing, an inlet port defined in said casing uncoverable by said piston during movement therebeyond, an exhaust port defined in said casing at a spaced location from said inlet port and being uncoverable by said piston, means for directing vapor under pressure to said inlet port, and valve means for said inlet and discharge port connected to said piston and effective upon movement of said piston to open said inlet to said vapor pressure means behind said piston and thereafter to close said inlet and open said exhaust port ahead of said piston and after said piston has moved therebeyond.

2. A rotary vapor engine according to claim 1, wherein said casing includes two spaced sets of inlet and exhaust ports, said valve means including portions connected to each of said ports and to said piston for cyclically opening said inlet port behind said piston and for thereafter closing said inlet port and opening said exhaust port ahead and thereafter behind said piston, and means deflectable by movement of said piston for dividing the marginal space into two separate vapor expansion chambers.

3. A rotary vapor engine according to claim 1, wherein said valve means for said inlet and discharge port includes means defining a valve opening, and a plate member slidable in said opening including means deflectable by movement of said piston to effect opening of said valve in timed relationship to rotation to said piston.

4. A rotary vapor engine according to claim 1, including wall means defining a vapor generating chamber below said casing and in communication with said inlet.

5. A rotary vapor engine according to claim 4, including an accumulation chamber connected to said exhaust valve for flow of exhaust vapor thereinto and valve means on said accumulator for periodically opening said accumulator to said steam generating chamber.

6. A rotary vapor engine according to claim 5, including a cooler compartment defined above said casing and connected to said cooling chamber and including separate exhaust valve means connected between said casing and said cooling chamber having means operable by motion of said piston to periodically communicate said casing with said cooling chamber.

7. A rotary vapor engine comprising an annular hollow ring having an internal annular opening, a piston member including a radial arm portion extending through said ring opening and a widened piston portion disposed within and rotatable around the interior of said ring, an inlet port defined on said ring uncoverable by said piston during movement therebeyond, an exhaust port defined on said ring at a spaced circumferential location from said inlet port, inlet valve means connected to said inlet port, exhaust valve means connected to said exhaust port, said valve means including a movable portion deflectable by said piston to open and close said inlet and exhaust ports cyclically based upon the position of said piston.

8. A rotary vapor engine according to claim 7, including at least two separate sets of circumferentially spaced inlet and exhaust ports and a gate member dividing said ring intermediate said sets of exhaust and inlet ports, said gate member being deflectable by said piston to permit piston movement through two separate steam expansion cycles each having separate inlet and exhaust ports.

9. A rotary vapor engine according to claim 7, including wall means defining a vapor generator chamber below said casing and in communication with the inlet ports thereon, an accumulator chamber defined above said vapor generator chamber, said exhaust valve being in communication with said accumulator chamber.

10. A rotary vapor engine according to claim 7, including a central shaft upon which said piston member is mounted and a fly wheel secured to said shaft.

11. A rotary vapor engine according to claim 7, including a cooling chamber defined above said casing, and second valve means communicating between said cooling chamber and said hollow ring.

12. A rotary vapor engine according to claim 11, including valve control means deflectable by movement of said piston to communicate said cooling chamber with said hollow ring cyclically upon movement of said piston.

13. A rotary vapor engine according to claim 12, said vapor generator and cooling compartment being separated solidly by said annular cylinder and accumulation chambers and valve means, exchanging and directing merely small vapor portions through said implements between the hot and cooled area of the engine, in the sealed housing circulating vapor retaining its latent heat continuously, thereby said vapor kept and working constantly above boiling point.

14. A rotary engine comprising an annular tubular casing, a rotary piston operating within said casing, an inlet port defined in said casing uncoverable by said piston during movement therebeyond, an exhaust port defined in said casing at a spaced location from said inlet port and being uncoverable by said piston, means for directing vapor under pressure to said inlet port, valve means for said inlet and discharge port connected to said piston and effective upon movement of said piston to open said inlet to said vapor pressure means behind said exhaust port ahead of said piston and after said piston has moved therebeyond, and a vapor accumulating chamber and an outwardly sealed cooling compartment, both of them adjacent said casing and communicating with it by valve means effective upon movement of said piston.

References Cited in the file of this patent

UNITED STATES PATENTS

| | | |
|---|---|---|
| 538,821 | Davis | May 7, 1895 |
| 548,812 | Nagel | Oct. 29, 1895 |
| 664,456 | Barry et al. | Dec. 25, 1900 |
| 841,987 | Lecaime | Jan. 22, 1907 |
| 977,027 | Massey | Nov. 29, 1910 |
| 1,300,666 | Spencer | Apr. 15, 1919 |
| 1,387,227 | Barrett | Aug. 9, 1921 |
| 1,647,464 | Parmele | Nov. 1, 1927 |
| 1,804,694 | Jones | May 12, 1931 |
| 2,525,804 | Kellogg | Oct. 17, 1950 |
| 2,707,863 | Rhodes | May 10, 1955 |
| 2,789,415 | Motsinger | Apr. 23, 1957 |